(12) United States Patent  (10) Patent No.: US 8,830,872 B2
Baum et al.  (45) Date of Patent: Sep. 9, 2014

(54) NETWORK CONFIGURATION FOR DEVICES WITH CONSTRAINED RESOURCES

(75) Inventors: Avraham Baum, Givat-Shmuel (IL); Artur Zaks, Modiin (IL); Ram Machness, Tel Aviv (IL); Nir Nitzani, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 135 days.

(21) Appl. No.: 13/439,109

(22) Filed: Apr. 4, 2012

(65) Prior Publication Data

US 2012/0257543 A1   Oct. 11, 2012

Related U.S. Application Data

(60) Provisional application No. 61/473,567, filed on Apr. 8, 2011.

(51) Int. Cl.
*H04L 12/28* (2006.01)
*H04W 84/22* (2009.01)
*H04W 84/20* (2009.01)

(52) U.S. Cl.
CPC .............. *H04W 84/22* (2013.01); *H04W 84/20* (2013.01)
USPC ....................................................... 370/255

(58) Field of Classification Search
None
See application file for complete search history.

(56) References Cited

U.S. PATENT DOCUMENTS

| | | | |
|---|---|---|---|
| 8,131,209 B1* | 3/2012 | Chen et al. ................... | 455/11.1 |
| 2004/0116075 A1* | 6/2004 | Shoemake et al. ........... | 455/41.2 |
| 2005/0088997 A1* | 4/2005 | Melpignano .................. | 370/338 |
| 2005/0107103 A1* | 5/2005 | Melpignano .................. | 455/502 |
| 2005/0176420 A1* | 8/2005 | Graves et al. ................ | 455/424 |
| 2006/0292987 A1* | 12/2006 | Ophir et al. .................. | 455/41.2 |
| 2007/0014267 A1* | 1/2007 | Lam et al. .................... | 370/338 |
| 2007/0190973 A1* | 8/2007 | Goto et al. ................... | 455/410 |
| 2007/0254614 A1* | 11/2007 | Muralidharan et al. ...... | 455/307 |
| 2008/0109880 A1* | 5/2008 | Shiu et al. .................... | 726/3 |
| 2009/0019283 A1* | 1/2009 | Muralidharan et al. ...... | 713/168 |
| 2009/0046591 A1* | 2/2009 | Krishnaswamy et al. .... | 370/252 |
| 2009/0137206 A1* | 5/2009 | Sherman et al. ............. | 455/41.2 |
| 2009/0325566 A1* | 12/2009 | Bell et al. ..................... | 455/419 |
| 2010/0142465 A1* | 6/2010 | Medepalli et al. ............ | 370/329 |
| 2010/0246551 A1* | 9/2010 | Chen et al. ................... | 370/338 |
| 2010/0296441 A1* | 11/2010 | Barkan ......................... | 370/328 |
| 2012/0014299 A1* | 1/2012 | Yoon et al. ................... | 370/310 |
| 2012/0171991 A1* | 7/2012 | Pham et al. ................... | 455/410 |
| 2012/0182976 A1* | 7/2012 | Thoukydides et al. ....... | 370/336 |
| 2013/0094390 A1* | 4/2013 | Chhabra ....................... | 370/252 |
| 2013/0178163 A1* | 7/2013 | Wang, Huaiyuan ......... | 455/41.2 |

* cited by examiner

*Primary Examiner* — Otis L Thompson, Jr.

(74) *Attorney, Agent, or Firm* — Alan A. R. Cooper; Frederick J. Telecky, Jr.

(57) ABSTRACT

A method includes receiving a wireless beacon from an ad hoc network at a wireless device, wherein the wireless beacon includes a data structure that encodes at least a portion of a wireless identifier of an access point. The method includes configuring the wireless device from the data structure received from the wireless beacon. The method also includes establishing a wireless network between the access point and the wireless device utilizing at least a portion of the wireless identifier encoded in the data structure.

22 Claims, 3 Drawing Sheets

| VENDOR PREFIX | SSID PREFIX SIZE | SSID PREFIX | SECURITY TYPE | SECURITY KEY SIZE | SECURITY KEY |

CONFIGURATION DATA STRUCTURE 200

NETWORK CONFIGURATION FOR DEVICES WITH CONSTRAINED RESOURCES

CROSS-REFERENCE TO RELATED APPLICATION

This application claims the benefit of priority to U.S. Provisional Patent Application No. 61/473,567, filed on Apr. 8th, 2011, and entitled "WLAN CONFIGURATION METHOD FOR DEVICES WITH MEMORY AND CPU CONSTRAINTS," the entirety of which is incorporated herein by reference.

BACKGROUND

Wireless network configuration often involves complex devices and configuration procedures to establish network connections for wireless network devices. In one example, a wireless local area network (WLAN) links two or more devices over a short distance using a wireless distribution method, usually providing a connection through a wireless access point for Internet access. Such networks are often supported by a local wireless access point such as in the home or business environment that communicates with one or more wireless devices to form the local network. The majority of wireless access points are used in home or small business wireless networks. Establishing such networks has become common procedure in regards to many devices that are available such as with laptop computers and printers, for example. However, standard procedures for adding a device to a network do not apply to devices that may have limited resources such as limited memory and processing capabilities that do not support more elaborate configuration possibilities.

SUMMARY

Network configuration systems and methods are provided for network devices having constrained resources such as limited memory and processing capabilities. In one example, a method includes receiving a wireless beacon from an ad hoc network at a wireless device, wherein the wireless beacon includes a data structure that encodes at least a portion of a wireless identifier of an access point. The method includes configuring the wireless device from the data structure received from the wireless beacon. The method also includes establishing a wireless network between the access point and the wireless device utilizing at least a portion of the wireless identifier encoded in the data structure.

In another example, a method includes receiving a wireless beacon at a wireless device via an ad hoc network, the wireless beacon having a first configuration data structure to specify initial network settings for the wireless device. The method includes configuring the wireless device according to the initial network settings specified in the first data structure. This includes establishing a connection with an access point utilizing the initial network settings specified in the first data structure. The method also includes broadcasting a second data structure to the wireless device over a designated communications port, the second data structure specifying a an updated security protocol for the wireless device. This can include configuring the wireless device and the access point according to the updated security protocol specified in the second data structure. The method can also include reestablishing the connection between the wireless device and the access point utilizing the updated security protocol.

In yet another example, a computer readable medium can be provided. The computer readable medium comprise computer executable instructions that when executed cause a processor to: process a wireless beacon received from an ad hoc network at a wireless device, wherein the wireless beacon includes a data structure that encodes at least a portion of a wireless identifier of an access point. The instructions also cause the processor to configure the wireless device from the data structure received from the wireless beacon. This includes causing the processor to establish a wireless network between the access point and the wireless device utilizing the at least a portion of the wireless identifier encoded in the data structure.

DETAILED DESCRIPTION

Figures 1, 2:
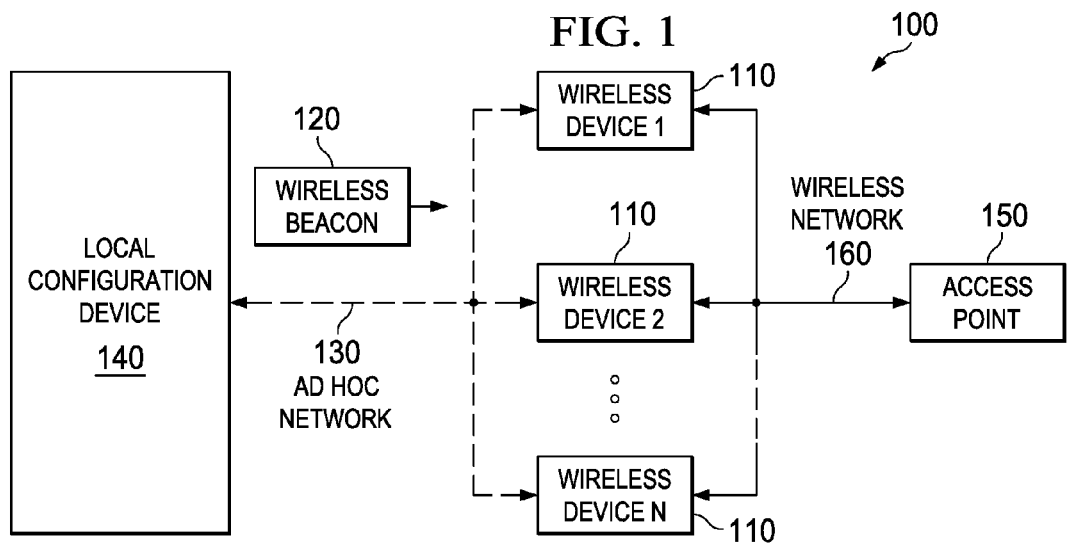
FIG. 1 illustrates an example of a system for performing network configuration of wireless devices having constrained resources.
FIG. 2 illustrates an example of a configuration data structure that can be broadcast on a wireless beacon to configure wireless devices having constrained resources.

FIG. 1 illustrates an example of a system 100 for performing network configuration of wireless devices 110 having constrained resources. As used herein, the term "constrained resources" refers to limited computer resources in electronic devices such as limited memory capacity or limited processing power, for example. In one example, modern laptop devices can be considered to have almost unlimited memory and processing resources with over a gigabyte of memory in many applications and the ability to process billions of CPU instructions per second. In contrast, the wireless devices described herein can be embedded devices with much lower memory and processing capabilities (e.g., one megabyte of memory and 100 megahertz operating speed which are orders of magnitude less than standard computing devices such as laptops).

The wireless devices 110 are shown as wireless device 1, wireless device 2, though wireless device N, where N is a positive integer. The wireless devices 110 receive a wireless beacon 120 from an ad hoc network 130 that is established by a local configuration device 140 such as a laptop computer, for example. The beacon 120 is a wireless signal that broadcasts network configuration information to the wireless devices 110. The ad hoc network 130 is utilized as a temporary or initial network (e.g., peer-to-peer network) that is employed between the local configuration device 140 and the wireless devices 110. The local configuration device 140 is configured to broadcast the wireless beacon 120 across the ad hoc network to establish initial network configuration for the wireless devices. Since the wireless devices 110 are constrained in their memory and/or processing capacity, they do not have the ability (e.g., enough memory and/or processing power to support a complex configuration algorithm) to establish connections on their own with an access point 150. The access point 150 can later serve as a persistent network connection for the wireless devices 110 after initial network configuration has been established across the ad hoc network 130.

The ad hoc network 130 can be considered a peer-to-peer network that does not utilize the access point 150 to establish connections and exchange configuration information between the local configuration device 140 and the wireless devices 110. In one example, the local configuration device 140 could be a laptop computer that employs standard ad hoc wireless networking configuration procedures. This can involve selecting network connections under a control panel setup screen from a laptop operating system menu and then selecting properties to set up the ad hoc network. From the properties menu, a wireless connection can be selected and then available procedures followed for adding an ad hoc network, for example. The local configuration device 140 could also be a less sophisticated device than a laptop computer such as a dedicated wireless appliance, for example, which is programmed specifically to supply configuration data structures to the wireless devices 110 via the wireless beacon 120. Alternatively or additionally, the configuration device can be any device or appliance that can transmit the beacon 120 via an ad hoc network (e.g., it could be a smart phone, tablet PC or the like).

The wireless devices 110 can be preprogrammed (e.g., via embedded logic, EEPROM, chipset) to monitor/receive the beacon 120 and in response to configure itself to the wireless network provided by the access point 150. The wireless devices 110 are typically embedded devices for establishing a network connection to a home controller for example. Such controller could operate systems within a home such as appliances for example. The ad hoc network 130 can be used in situations such as a quick data exchange since the setup is straight forward and does not initially require the access point 150. Due to its peer-to-peer layout, ad hoc connections are similar to Bluetooth connections, for example, and are generally not utilized for a permanent installation.

The wireless beacon 120 can include a data structure that encodes at least a portion of a wireless identifier of the access point 150. In addition to the wireless identifier of the access point 150, the data structure broadcast in the wireless beacon 120 could also include the type of wireless network to establish and the type of security protocols as well as security parameters to employ in a wireless network connection with the access point 150, for example. Each of the wireless devices 110 can configure itself for wireless network operations with the access point 150 based on the data structure received from the wireless beacon. This can include establishing a wireless network 160 between the access point 150 and the respective wireless devices 110 utilizing at least a portion of the wireless identifier encoded in the data structure. As will be described below, subsequent configuration data can be transmitted to the wireless devices 110 such as to increase security protocols within the wireless network 160. Various configuration alternatives can also be supported in the wireless devices 110 where such alternatives could be initiated via a configuration switch selected on the wireless devices, for example. After the wireless network 160 has been established between the wireless devices 110 and the access point 150, the ad hoc network 130 can be disabled and the local configuration device 140 then employed for other purposes as it is no longer needed to configure any of the wireless devices 110.

For purposes of simplification of explanation, in the present example, different components of the systems described herein are illustrated and described as performing different functions. However, one of ordinary skill in the art will understand and appreciate that the functions of the described components can be performed by different components, and the functionality of several components can be combined and executed on a single component or be further distributed across more components. For example, the local configuration device 140 may be integrated into the access point 150 and operate the ad hoc network 130, which is separate from the wireless network 160, in response to a user input (e.g., activating a configuration function thereof). The components can be implemented, for example, as computer executable instructions (e.g., software, firmware), hardware (e.g., CPU, an application specific integrated circuit), or as a combination of both. In other examples, the components could be distributed among remote devices across a network, for example.

FIG. 2 illustrates an example of a configuration data structure 200 that can be broadcast on a wireless beacon to supply network configuration for wireless devices having constrained resources. As shown, the configuration data structure 200 can include various data fields such as a vendor prefix, a service set identifier (SSID) prefix size, an SSID prefix which can include the full SSID or a partial SSID, a security type, a security key size, and a security key. The configuration data structure 200 can include more or less fields than the example configuration data fields shown. The following table provides additional details on the various example data fields in the configuration data structure 200. Some of the acronyms for the example security types included in the table include wireless encryption protocol (WEP), Wi-Fi protected access protocol (WPA), pre-shared key protocol (PSK), and Wi-Fi protected access 2 pre-shared key (WPA2 PSK).

TABLE 1

| Field Name | Field Length | Field Description |
| --- | --- | --- |
| Vendor Prefix | 3 | Used to identify wireless device vendor. Programmed into wireless device EEPROM. Published by Device vendor in "Quick Setup guide, for example" |
| SSID Prefix | 1-15 | First characters of the access points SSID to connect. Can be full SSID. Wireless device can connect to SSID that starts from SSID Prefix. |
| SSID Prefix Size | 1 | SSID Prefix Size |
| Security Type | 1 | Connection Security type: None, WEP, WPA PSK, WPA2 PSK |
| Security Key Size | 1 | Size of security key per Security type |
| Security Key | 0-16 | Security Key in the format defined by Security Type |

Based on the data contained in the configuration data structure 200 and broadcast on the wireless beacon described above, the wireless device can then use such information to configure itself for subsequent network operation with an access point. In one configuration alternative, for a first time configuration of the wireless device, a standard user interface from a conventional operating system can be employed to start an ad hoc network with the SSID defined per first time configuration structure guidelines without providing any security parameters. In another configuration alternative, a profile can be added to a wireless connections manager of the operating system for SSID defined per first time configuration structure guidelines. The wireless device user can then request to connect to this SSID contained in the profile and can continue to make requests to reconnect if there are connection failures.

Figure 3:
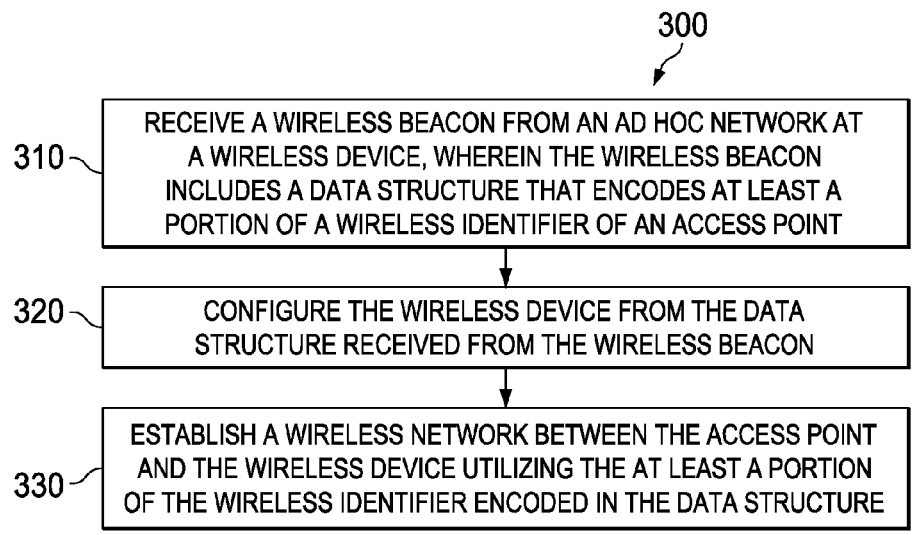
FIG. 3 illustrates an example method for configuring a network device having constrained resources.
Figure 4:
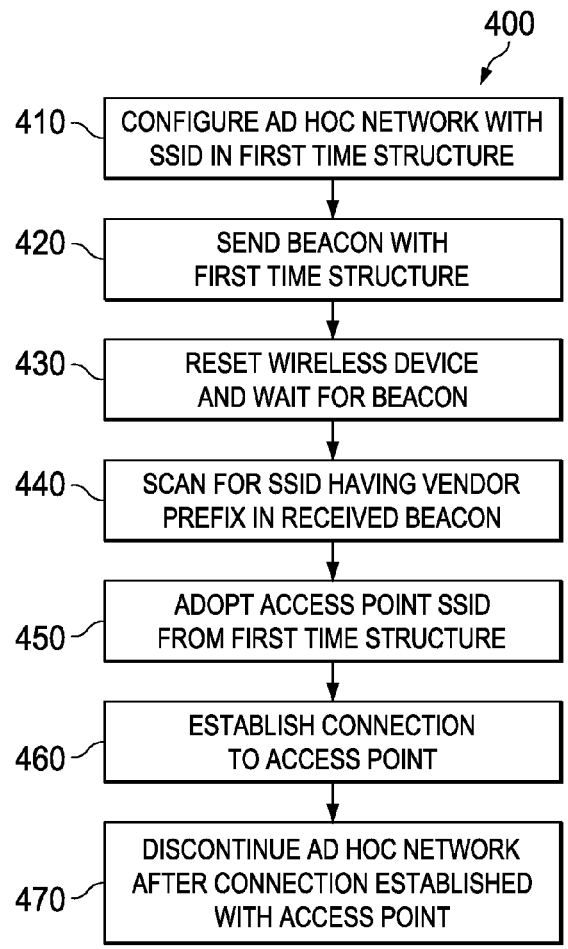
FIG. 4 illustrates an example method for first time configuration of a network device having constrained resources.
Figure 6:
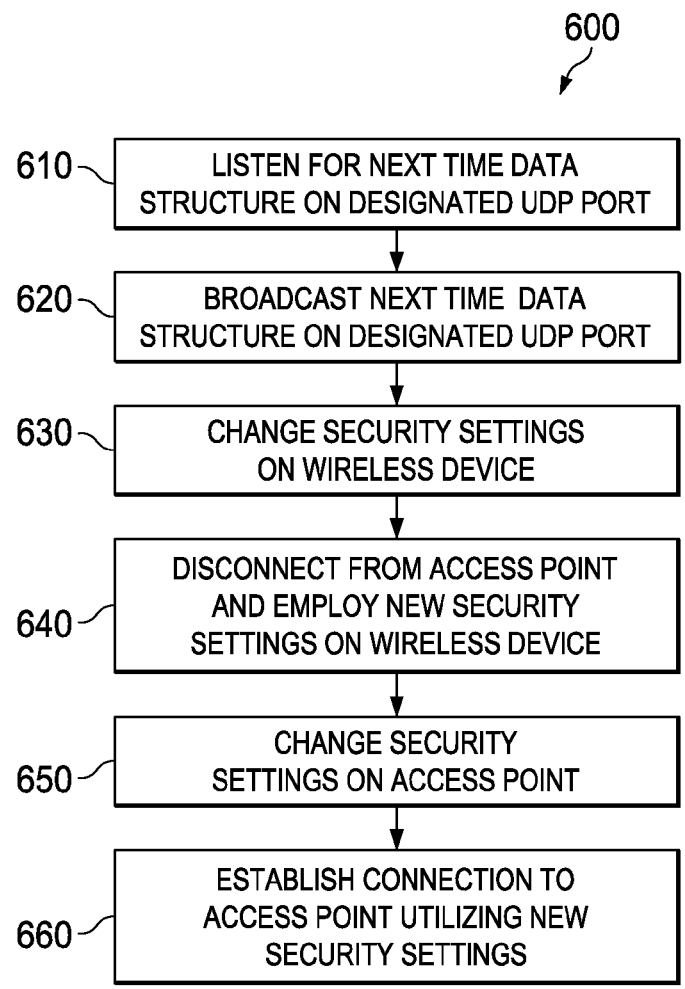
FIG. 6 illustrates an example method for a subsequent configuration of a network device having constrained resources.

In view of the foregoing structural and functional features described above, an example method will be better appreciated with reference to FIGS. 3, 4, and 6. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be stored in memory as machine readable instructions. The machine readable instructions corresponding to the methods can also be executed by a processor in a computer, such as a server, for example. Before proceeding, it is noted that FIG. 3 provides a generalized method that describes the basic components of network configuration for devices having constrained resources. FIG. 4 provides an example of a first time configuration method for devices having constrained resources, and FIG. 6 illustrates an alternative configuration method for devices having constrained resources.

FIG. 3 illustrates an example method 300 for configuring a network device having constrained resources. At 310, the method 300 includes receiving a wireless beacon from an ad hoc network at a wireless device, wherein the wireless beacon includes a data structure that encodes at least a portion of a wireless identifier of an access point. Such wireless beacon can be transmitted via a local configuration device such as a laptop computer or a wireless appliance. The beacon can be received by a constrained network device, such as a home controller having a wireless connection. As described above, the home controller can receive remote command signals from the wireless device, where such command signals could be utilized to operate devices or systems within a home or business.

At 320, the method includes configuring the wireless device from the data structure received from the wireless beacon. This can include having the constrained wireless device configure itself on a startup procedure such as after a reset button has been selected on the device. The wireless devices can be pre-programmed to receive the beacon, extract the data structure having configuration parameters, and execute a configuration function on the wireless devices based on the configuration parameters. At 330, the method 300 includes establishing a wireless network between the access point and the wireless device utilizing the portion of the wireless identifier encoded in the data structure. For example, this can include utilizing all or portions of a service set identifier (SSID) to then employ as an identifier to establish subsequent communications with a wireless access point identified by the respective SSID.

FIG. 4 illustrates an example method 400 for first time configuration of a network device having constrained resources. At 410, an ad hoc network is configured utilizing standard operating system procedures for initiating such a network. A service set identifier (SSID) is configured for the ad hoc network in a first time data structure among other parameters such as security parameters outlined above in the examples depicted in Table 1. At 420, a beacon is transmitted across the ad hoc network, wherein the beacon contains the first time data structure configured at 410. At 430, a wireless device having constrained resources is reset and placed into configuration mode. At 440 of the method 400, the wireless device scans for the SSID and vendor prefix in the first time data structure received in the beacon. At 450, the wireless device adopts the access point SSID from the first time structure received in the beacon. At 460, a wireless connection (e.g., secure connection) is established between the wireless device and the access point. After the wireless connection is established between the access point and wireless device, the ad hoc network can be discontinued such as shown at 470 of the method 400.

The following provides some configuration procedure examples that can be implemented for wireless devices in accordance with the methods depicted and described above with respect to FIGS. 3 and 4.

Wireless Device Factory Reset Example:
1. On Wireless Device, press reset button for a predetermined time (e.g., about 3 seconds) and release it. Configuration LED starts blinking.
2. Wireless Device enters factory reset state and scans for beacons and probe requests SSID starting from 3-characted Vendor Prefix configured by device vendor in EEPROM.
3. When Beacon or probe request with Vendor Prefix is found, use the first time configuration structure received in the SSID for auto connect to access point.

Wireless Device Connection Process after Factory Reset
1. Perform Active Scan for a predetermined time (e.g., about 0.5 seconds). Use SSID prefix as access point SSID to scan for. This can be used to expedite connection processes and to resolve access point with hidden SSID and SSID length.
2. (Alternative) If no access point is found, perform passive scan for 2 seconds collecting all beacons and probe responses. Detect access points with SSID starting from SSID Prefix.
3. After access point is found, connect to it with SSID detected in access point's beacon or probe response and security received in the first time configuration structure. The device then stores the full SSID that it successfully connected in the process of the first time structure.

Figure 5:
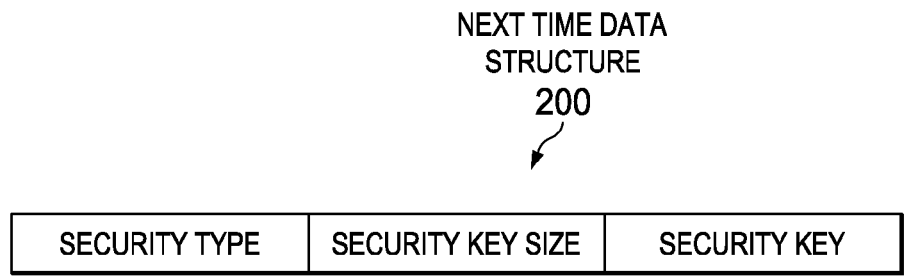
FIG. 5 illustrates an example of data structure for a subsequent configuration of a network device having constrained resources.

FIG. 5 illustrates an example of data structure 500 for a subsequent configuration of a network device having constrained resources. In this example, the data structure 500 can also be referred to as a next time structure as it can be utilized to reconfigure an already-configured wireless device. In other words, this data structure 500 can be employed after the first time structure described above has been utilized for initial network configuration. As shown, the data structure 500 can include a security type field, a security key size field, and a security key field. Similar to the data structure 200 described above, the security type field can indicate no security, WEP protocol, WPA protocol, or WPA2, for example. The security key size field can have different meaning depending on the security type selected. For example, if Security Type=0 (No, KeySize=0). If Security Type=1 (WEP), KeySize=5 or D (13). Actual Key Length is KeySize. If Security Type=⅔ (WPA/WPA2), Key Size=0 to F hexadecimal (Actual Key length is KeySize+1). Other codes, types, and combinations are possible.

FIG. 6 illustrates an example method 600 for a subsequent configuration of a network device having constrained resources. The method 600 can utilize the next time data structure 500 depicted above in FIG. 5 for further network configuration of the constrained device. In this example method 600, both the local configuration device and the wireless device to be configured are operational with the access point. For example, at 610, the method 600 listens for a next time data structure on a designated user datagram protocol (UDP) port (e.g., port 100001). At 620, the method broadcasts the next time data structure on the designated UDP port. Such broadcast can be initiated from a local configuration device such as a laptop computer, for example. At 630, the wireless device that has received the next time structure changes its respective security settings in accordance with the parameters specified in the next time structure. The wireless device may also change other configuration parameters specified in the next time structure.

At 640, the wireless device disconnects itself from the access point and begins to employ the updated security settings received in the next time data structure. At 650, the security settings for the access point are changed to match those designated in the next time structure. Such changing of the access point could occur via the local configuration device for example or via local switch settings on the access point, for example. At 660, a connection can be established between the wireless device and the access point utilizing the updated security settings specified in the next time structure. Similar to above, the local configuration device is not longer required at this point for further network communications between the wireless device and the access point.

Various alternative configuration examples are possible than those that have been outlined in the methods described herein. In one configuration example, connections can be limited to the nearby devices, where a factory default received signal strength indication (RSSI) could be −55 dBm, for example. Thus, in the first time configuration procedure, all results with an RSSI less than factory default setting can be filtered out. In another configuration example, connections to multiple vendor prefixes can be enabled. Thus, an EEPROM (or other memory device) can store two or more Vendor Prefixes such as Normal Priority and High priority, for example. In the first time configuration procedure, capture Beacon, Probe Request or Probe Response can be communicated with Normal Priority and High Priority Vendor prefixes. If only one SSID with vendor prefix is captured, the information in SSID can be utilized by the wireless device to configure the first time connection. If both vendor prefixes are captured, the wireless device can use the High Priority vendor prefix for configuration, for example.

In yet another configuration example, the wireless device can utilize factory default shared secrets, where the wireless device vendor can assign the shared secret to the device. Shared secrets are security codes shared between devices and can be programmed into the device EEPROM at the manufacturing process and printed on the label attached to the device, for example. Wireless device vendors can create a personal computer utility to encrypt encryption key fields of the first time configuration structure with a shared secret. Such utility can provide an output string that can be copied into the SSID on the configuration device and used for the first time configuration procedure. The wireless device can be extended to decrypt the security key from the first time configuration structure using the shared secret, for example. The decrypted security key can then be used for the connection to the access point.

In another configuration example, LED and reset control can be provided on the wireless device. A default wireless device reference design hardware configuration can include LED and factory resets that can be connected to input/output (I/O) connections on the wireless device. The wireless device reacts upon change in status of reset I/O and changes the state of the LED, for example. Alternatively, the wireless device vendor can connect LED and reset buttons to a host device and use EEPROM access procedures to change the EEPROM contents to factory defaults or modify the status of the LED during network configuration procedures to reflect current status of the configuration process.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method, comprising:
   receiving a wireless beacon from an ad hoc network at a wireless device, wherein the wireless beacon includes a data structure that encodes at least a portion of a wireless local area network ("WLAN") identifier of an access point;
   wherein the access point is not utilized to establish connections and exchange information between any local configuration devices of the ad hoc network and the wireless device;
   configuring the wireless device based on the data structure received from the wireless beacon; and
   establishing a WLAN between the access point and the wireless device utilizing the at least a portion of the WLAN identifier encoded in the data structure, wherein the WLAN identifier included in the data structure includes a service set identifier (SSID).

2. The method of claim 1, wherein the data structure includes an SSID prefix, an SSID size field to indicate a length for the SSID prefix, and a vendor identifier to indicate which vendor manufactured the wireless device.

3. The method of claim 1, wherein the data structure further comprises a security type field to indicate which type of security protocol to employ and a security key that is employed to establish secure connections between the wireless device and the access point.

4. The method of claim 3, wherein the security protocol comprises a wireless encryption protocol (WEP), a Wi-Fi protected access protocol (WPA), a pre-shared key protocol (PSK), or a Wi-Fi protected access 2 pre-shared key protocol (WPA2 PSK).

5. The method of claim 1, further comprising generating a profile in a connections manager of a configuration device to specify the wireless identifier.

6. The method of claim 1, further comprising receiving another wireless beacon that encodes a second configuration data structure that specifies an updated security configuration for the wireless network.

7. The method of claim 6, wherein the second configuration data structure specifies a security type, a security key size, and a security key.

8. The method of claim 6, wherein the second configuration data structure is received by the wireless device over a designated communications port.

9. The method of claim 8, wherein the designated communications port is a user datagram protocol (UDP) port.

10. The method of claim 1, further comprising limiting wireless device configurations to signals that are received below a received signal strength indicator (RSSI) threshold.

11. The method of claim 1, further comprising processing multiple vendor prefixes when configuring the wireless device for network operations.

12. The method of claim 11, wherein the multiple vendor prefixes include normal priority prefix and a high priority prefix.

13. The method of claim 1, further comprising configuring the wireless device with a default shared secret code for network configurations.

14. The method of claim 1, further comprising utilizing an input/output point on the wireless device to effectuate reset operations on the wireless device for network configurations.

15. The method of claim 1, further comprising wherein the ad hoc connection is severed after establishing the WLAN between the access point and the wireless device, but before disestablishing the WLAN between the access point and the wireless device.

16. A method, comprising:
   receiving a wireless beacon at a wireless device via an ad hoc network, the wireless beacon having a first configuration data structure to specify initial network settings for the wireless device;
   configuring the wireless device according to the initial network settings specified in the first data structure;
   establishing a connection with an access point utilizing the initial network settings specified in the first data structure, wherein the access point is not utilized to establish connections and exchange information between any local configuration devices of the ad hoc network and the wireless device,
   wherein the first configuration data structure includes an SSID prefix, an SSID size field to indicate a length for the SSID prefix,
   broadcasting a second data structure to the wireless device over a designated communications port, the second data structure specifying a an updated security protocol for the wireless device;
   configuring the wireless device and the access point according to the updated security protocol specified in the second data structure; and
   reestablishing the connection between the wireless device and the access point utilizing the updated security protocol over a wireless local area network ("WLAN").

17. The method of claim 16, wherein the first configuration data structure includes a vendor identifier to indicate which vendor manufactured the wireless device.

18. The method of claim 17, wherein the first configuration data structure includes a security type field to indicate which type of security protocol to employ and a security key that is employed to establish secure connections between the wireless device and the access point.

19. The method of claim 16, wherein the designated communications port is a user datagram protocol (UDP) port.

20. The method of claim 16, further comprising wherein the ad hoc connection is severed after establishing the WLAN between the access point and the wireless device, but before disestablishing the WLAN between the access point and the wireless device.

21. A non-transitory computer readable medium comprising computer executable instructions that when executed cause a processor to:
   process a wireless beacon received from an ad hoc network at a wireless device, wherein the wireless beacon includes a data structure that encodes at least a portion of a wireless identifier of an access point;
   wherein the access point is not utilized to establish connections and exchange information between any local configuration devices of the ad hoc network and the wireless device;
   configure the wireless device based on the data structure of the wireless beacon; and
   establish a wireless local area network (WLAN) between the access point and the wireless device utilizing the at least a portion of the WLAN identifier encoded in the data structure,
   wherein the WLAN identifier included in the data structure includes a service set identifier (SSID).

22. The non-transitory computer readable medium of claim 21, further comprising wherein the ad hoc connection is severed after establishing the WLAN between the access point and the wireless device, but before disestablishing the WLAN between the access point and the wireless device.

* * * * *